United States Patent

[11] 3,602,041

[72] Inventor Bruce R. Weinert
 Dearborn, Mich.
[21] Appl. No. 828,518
[22] Filed May 28, 1969
[45] Patented Aug. 31, 1971
[73] Assignee The United States of America as represented by the Secretary of the Army

[54] ENGINE WEAR LIFE MEASUREMENT
 4 Claims, 2 Drawing Figs.
[52] U.S. Cl. .................................................. 73/116, 73/91
[51] Int. Cl. .................................................. G01n 3/32
[50] Field of Search .......................................... 73/116, 91, 115, 88.5

[56] References Cited
UNITED STATES PATENTS
2,282,826  5/1942  Rippingille .................. 73/91 X
3,272,003  9/1966  Harting ....................... 73/88.5 X Primary Examiner—Jerry W. Myracle
Attorneys—Harry M. Saragovitz, Edward J. Kelly, Herbert Berl and Arthur L. Girard ABSTRACT: A method and apparatus for the measurement of elapsed wear life of internal combustion engines using stress life history gages, (S/N Fatigue Life Gages) and strain amplifiers is disclosed.

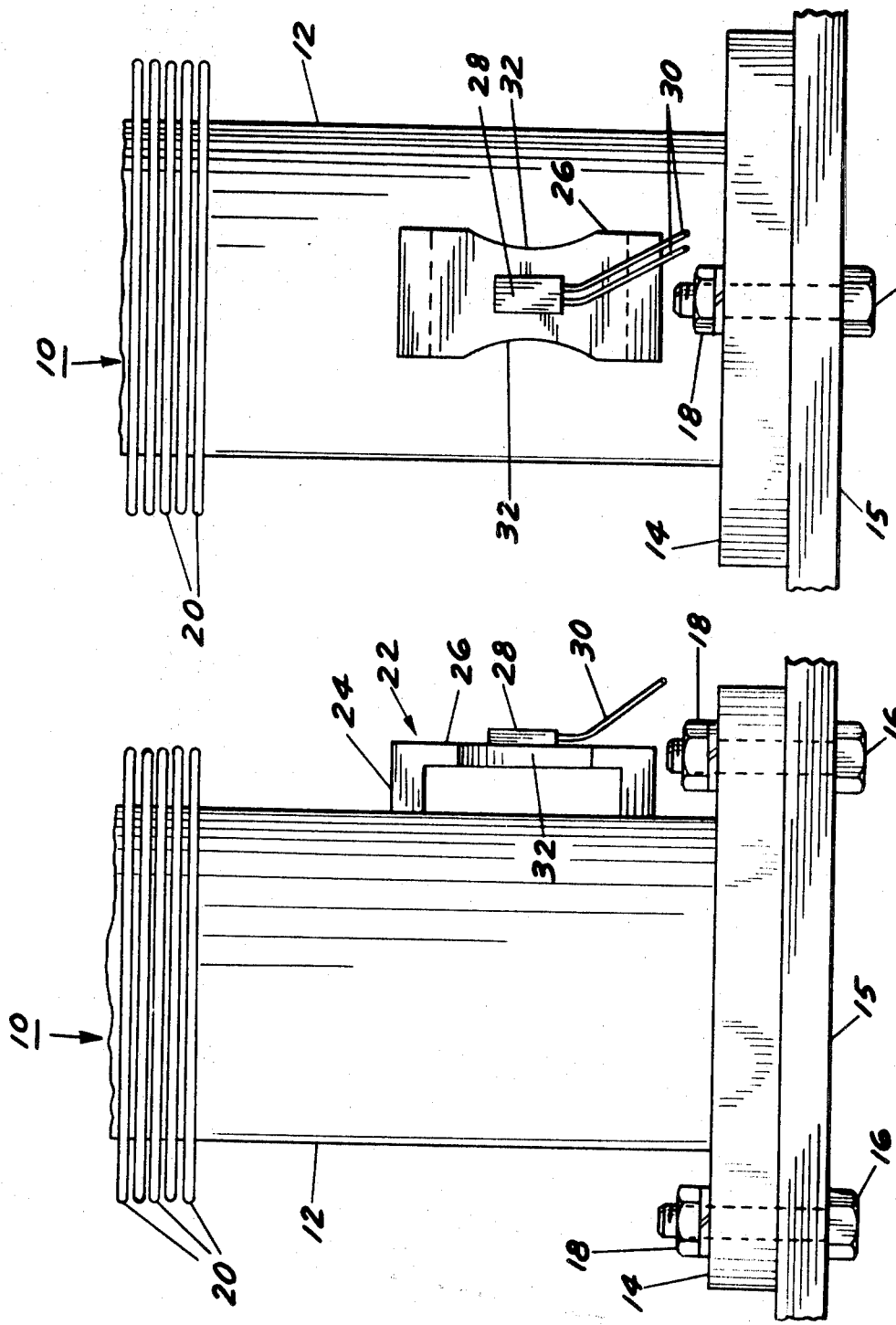

ENGINE WEAR LIFE MEASUREMENT

This invention may be manufactured and used by or for the Government for governmental purposes without the payment to me of any royalty thereon or therefor.

This invention relates to the use of stress life history gages (S/N Fatigue Life Gages for determining the projected, standard and elapsed life of internal combustion engines and to a strain gage-strain amplifier apparatus suitable to this undertaking.

The elapsed and projected wear lives of internal combustion engines including turbine engines have until now generally been measured or estimated on the basis of the number of operating hours or, in the case where the engine is used in a vehicle, an odometer reading. As should be quite clear, such methods fail to provide very accurate data in this regard since they fail in any way to account for the speed, at which the engine was run or for that matter the load applied to the engine during operation. An engine run 1,000 hours or 10,000 miles at 1,500 r.p.m. and no load will surely not show the severity of wear demonstrated by an engine operated at 6,000 r.p.m. for the same number of hours or miles. Hence, it would be advantageous to provide a method of measuring wear life which measures not only time or distance of operation, but also a cumulative measure of the work done by the engine during its operation.

Other methods for determining wear life have been developed. However, by and large these call for constant and continuous monitoring of stress changes in engine parts and hence in addition requiring the transportation of bulky equipment call for the expension of large amounts of time and the keeping of detailed records so that the changes can be accurately traced.

It is therefore an object of the present invention to provide substantially improved means and methods for accurately measuring the wear life of internal combustion engines.

It is another object of the present invention to provide an apparatus and method which provide a cumulative determination of wear life and does not require continuous monitoring of stress changes to provide a determination of engine life.

Other objects and advantages of the present invention will be made obvious to those skilled in the art by the following description when considered in relation to the accompanying drawing of which:

FIG. I is a side view of a stress life history gage mounted on a cylinder of an internal combustion engine in accordance with a preferred embodiment of the present invention; and FIG. II is a front view of a stress life history gage mounted on a cylinder of an internal combustion engine in accordance with the preferred embodiment of FIG. I.

According to the present invention, there is provided the means and method for the relatively accurate determination of the wear life of internal combustion engines. More particularly, there is provided in combination an internal combustion engine and a stress life history gage of a work-hardening material whose resistance change provides a cumulative measure of the wear life of such engine, which measure can be taken quickly and easily at regular or irregular intervals to provide an accurate measure of wear life which relates directly to the experience history of the engine.

The present invention preferably utilizes "S/N" Fatigue Life Gages of the type described in U.S. Pat. No. 3,272,003 to achieve the above-described objects and advantages.

The "S/N" Fatigue Life Gage is a small, bondable resistance sensor similar in appearance to a foil strain gage. When installed on critical areas of a component which is subjected to repeated stress loading, it generates a permanent resistance change as a continuous function of fatigue experience of the foil element of the gage, i.e. it hardens with work and as it hardens undergoes permanent alteration of its electrical resistance. Even when caused by a completely random selection of load cycles, the resistance change of the gage accumulates as a function of actual structural fatigue damage is the stress element over a wide spectrum of operation conditions.

Unlike other resistance-changing sensors such as conventional strain gages and resistance thermometers, this species of gage need not be connected to a readout instrument while it is operating, but may be interrogated periodically using a suitable resistance measuring device which is connected to the gage only long enough to indicate or record gage resistance. In many cases, the resistance change is large enough to permit use of simple and inexpensive readout instrumentation of the ohmmeter or Wheatstone bridge type. Typical values for $\Delta R$ (resistance change) at the termination of specimen life are 4 to 8 ohms for a 100 ohm sensor.

The gage should be bonded to the engine using the best available strain gage techniques. If cemented directly to the engine the cement used must be compatible with the deflection to be experienced, the engine material (steel or aluminum), and the gage backing.

In the application of the "S/N" Fatigue Life Gage to an internal combustion engine great care must be taken to locate the gage in a position on the engine where it will be able to adequately detect the use-abuse experience applied to the engine, while not being damaged or detached due to extremes of heat or vibration. Thus, the point of application to the engine must be carefully selected. Recommended application of such gages is at a point where an optimum resistance change correlates with the experienced wear history of the engine. Clearly, it would be difficult to discover such an ideal position on a conventional internal combustion engine since application of the gage or gages to the interior of the cylinder wall or the piston is practically infeasible. However, some relatively accurate measurements can be obtained by applying the gage either direction or indirectly (as described in a preferred embodiment below) to some portion of the engine which experiences a maximum of the measurable strain indications which are indicative of overall and particularly internal strain experienced by the engine while being cool enough and permitting relative ease in application of the gage device. For purposes of this invention the cylinder base, or the cylinder wall was selected as providing an optimum location in all of the aforementioned regards. It should be noted however, that any other suitable orientation meeting the aforementioned requirements fall within the scope of this disclosure.

In view of the high temperatures encountered in operating internal combustion engines, it has been found preferential not to mount the gage grid directly upon the engine at the cylinder base or on the cylinder wall, or in any other suitable position although such application remains feasible and could prove more useful and accurate in certain applications.

According to a preferred embodiment of the present invention, the grid or actual work-hardening gage is mounted upon a strain amplifier (strain concentrator) which is in turn mounted at some desirable location on the engine.

Such an arrangement is depicted in the side view of FIG. I. As shown therein, the strain amplifier—"S/N" Fatigue Life Gage structure 22 is secured to a cylinder 10. The cylinder 10 comprises a cylinder base 14 which is secured in position on chassis 15 by bolts 16 and 18, a cylinder wall 12 and fins 20. The strain amplifier and gage 22 of the present invention comprises leg members 24 which are joined to cylinder wall 12 by some suitable joining means such as the weld shown at points 25. Mounted upon and forming a bridge-type link between leg members 24 is a crosspiece 26 having grid 28 mounted thereon. Conductively connected to grid 28 are wires 30 which serve to provide a means for measuring resistance across the grid 26 by connecting the grid with the measuring instruments or other detection means. It is the bridge type structure made up of legs 24 and crosspiece 26 which comprises the strain amplifier. The recesses 32 in crosspiece 26, which are shown more clearly in FIG. II cause the bridge-type structure to amplify the strains experienced by cylinder wall 12. Amplification is accomplished by this structure since the stress or strain experienced over the whole width of legs 24 secured to cylinder wall 12 is transmitted undiminished to both ends of crosspiece 26 mounted on legs 24. This strain is then concentrated or amplified by causing the strain to be experienced by a narrower portion of the bridge which lies between recesses 32 and upon which grid 28 is mounted.

The amplifier structure serves a dual purpose. First of all, as mentioned above, it obviates the difficulties inherent in mounting the grid directly upon the engine, and secondly by amplifying the strain of work experienced by the engine before it reaches the grid, it renders measurement of resistance across the grid thus permitting the use of less sophisticated instrumentation. Added advantages in the form of measurements of greater accuracy can be achieved if the instrumentation utilized for detection is such that the resistance values which are to be measured make maximum use of the range of the gage, i.e., the instrument readings occur at the upper end of the instruments range. With the grid undergoing an increased work experience due to strain amplification, an increased change of resistance which is more easily detectable and more accurately measurable is concurrently produced.

As mentioned above, the grid or "S/N" Fatigue Life Gage utilized in the present invention is of the type described in U.S. Pat. No. 3,272,003. The amplifier can consist of any suitable material which is capable of withstanding the temperatures produced by the engine and consistently transmitting the strain applied to the engine to the work hardening grid.

Lead Turrets (if used) should be at the lowest possible strain level compatible with proper location of the grid. In case such as that shown, where lead wires are used, special care should be taken to minimize the size of the solder joint at the lead turret.

As a practical matter, when one desires to install such a fatigue life gage on an engine such that accurate measurement of wear life can be measured, a standard distribution curve which relates grid resistance to wear life for that type of engine can be determined. Once this is accomplished, by test cell and/or field experience operation for the service life of the engine, installation of a system similar to that used to determine the standard distribution just described when applied to a similar engine permits the testor to take resistance readings from his engine and by comparison to the established standard determine the wear life of the engine.

Since as a practical matter the wear life of an entire engine is not a direct function of the wear life of a single cylinder or single portion of the entire engine, it is preferred that a plurality of the strain amplifier-strain gage structures described herein be applied at a variety of locations on the engine and that they be monitored singly to display individual measurements of grid resistance, or that such individual monitoring be funneled into an averaging circuit which produces a single averaged display of the grid resistances and hence wear life of the entire engine. Thus, in the preferred embodiment of the invention described above, a strain amplifier-strain gage structure would be mounted on the cylinder wall of each cylinder at a point near the base thereof. In this manner more accurate measure of engine wear life can be made.

As should be clear to one skilled in the engine diagnostic arts, the means and method described herein do not provide an indicator of particular weaknesses or flaws in the engine, but an overall indication of the wear life of the entire engine which can narrow to a large degree the field of search for particular individual problems which generally occur at certain points in the overall wear life of a given engine type.

Since it is obvious that many changes and modifications can be made in the above-described details without departing from the nature and spirit of the invention it is to be understood that the invention is not limited to said details except as set forth in the appended claims.

I claim:

1. In combination an internal combustion engine, at least one strain gage, said strain gage comprising a grid of conductive work-hardening material which undergoes a finite and permanent change in resistance with repeated loading, means for measuring said resistance and producing an output indicative thereof and wherein said engine has at least one cylinder having one of said strain gages mounted at the base thereof.

2. The combination of claim 1 wherein said engine has a plurality of said cylinders, each of said cylinders has one of said strain gages mounted at the base thereof and including means for averaging the output of said strain gages to provide an overall analysis of the wear life of said engine.

3. The combination of claim 1 wherein each of said strain gages is mounted upon a strain amplifier, said strain amplifier comprising a bridge-type structure having at least two leg members connected by a crosspiece, said crosspiece having opposing longitudinal recesses therein, said strain gage is mounted between said opposing longitudinal recess at the point of maximum strain on said crosspiece and wherein said engine has at least one cylinder having one of said strain amplifiers and one of said strain gages mounted thereon.

4. The combination of claim 3 wherein said engine has a plurality of said cylinders, each of said cylinders has at least one of said strain amplifiers and one of said strain gages mounted at the base thereof and including means for averaging said output of said means for measuring resistance to provide an overall analysis of the wear life of said engine.